United States Patent [19]

Bacon et al.

[11] Patent Number: 5,473,344
[45] Date of Patent: Dec. 5, 1995

[54] 3-D CURSOR POSITIONING DEVICE

[75] Inventors: Glade B. Bacon, Everett; Steven T. Kaneko, Seattle; Alan W. McRobert, Bothell; Eric H. Michelman, Seattle, all of Wash.

[73] Assignee: Microsoft corporation, Redmond, Wash.

[21] Appl. No.: 178,524

[22] Filed: Jan. 6, 1994

[51] Int. Cl.⁶ ................................................. G09G 3/02
[52] U.S. Cl. ........................................... 345/163; 345/157
[58] Field of Search ................................. 345/163, 164, 345/165, 167, 40, 161

[56] References Cited

U.S. PATENT DOCUMENTS

| | | |
|---|---|---|
| D. 281,776 | 12/1985 | Griffin . |
| D. 291,318 | 8/1987 | Kim . |
| D. 302,010 | 7/1989 | McLaughlin et al. . |
| D. 315,896 | 4/1991 | Brown . |
| 3,643,148 | 2/1972 | Brown . |
| 4,180,860 | 12/1979 | Driscoll et al. ............................ 345/40 |
| 4,464,652 | 8/1984 | Lapson et al. . |
| 4,533,830 | 8/1985 | Beauprey . |
| 4,538,476 | 9/1985 | Luque . |
| 4,562,314 | 12/1985 | Hosogoe et al. . |
| 4,573,924 | 3/1986 | Styers . |
| 4,578,674 | 3/1986 | Baker et al. . |
| 4,682,159 | 7/1987 | Davison . |
| 4,698,626 | 10/1987 | Sato et al. . |
| 4,736,191 | 4/1988 | Matzke et al. . |
| 4,782,335 | 11/1988 | Gussin ............................ 345/161 |
| 4,786,768 | 11/1988 | Langewis et al. . |
| 4,786,892 | 11/1988 | Kubo et al. . |
| 4,823,634 | 4/1989 | Culver . |
| 4,917,516 | 4/1990 | Retter ............................ 345/163 |
| 4,949,080 | 8/1990 | Mikan . |
| 5,045,843 | 9/1991 | Hansen . |
| 5,142,506 | 8/1992 | Edwards . |
| 5,186,629 | 2/1993 | Rohen ............................ 345/163 |
| 5,204,947 | 4/1993 | Bernstein et al. ............................ 345/163 |
| 5,298,919 | 3/1994 | Chang ............................ 345/167 |
| 5,313,230 | 5/1994 | Venolia et al. . |

FOREIGN PATENT DOCUMENTS

| | | | |
|---|---|---|---|
| 0531829 | 3/1993 | European Pat. Off. ............ H03J 9/06 |
| 4211189 | 10/1993 | Germany ............................ G06F 3/033 |
| 3184118 | 12/1991 | Japan ............................ G06F 3/033 |
| WO93/03475 | 2/1993 | WIPO ............................ G09G 5/00 |
| WO93/11526 | 6/1993 | WIPO . |

OTHER PUBLICATIONS

FastTrap™ Trackball by Microspeed packinging materials bearing copyright date of 1987.
"The Evolving Mouse", *PC Magazine*:250, Jan. 11, 1994.
Grabowski, Ralph, "Z Mouse gives CAD designers 3–D control", *InfoWorld*:93, Jul. 13, 1992.
Venolia, Dan, "Facile 3D Direct Manipulation", *Interchi '93*:31–36, 24–29 Apr. 1993.
"Depth/Force Capability for Mouse Pointing Devices," No. 342:769, Emsworth, Great Britain, Oct., 1992.
"Mouse Device for Inputting Direction on 2D Screen," *IBM Technical Disclosure Bulletin*, 35(4B):348, New York, Sep. 1992.
"Peripheral Hardware," *Machine Design*, 16(14):71, Cleveland, Ohio, Jun. 16, 1988.

*Primary Examiner*—Curtis Kuntz
*Assistant Examiner*—Vivian W. Chang
*Attorney, Agent, or Firm*—Seed and Berry

[57] ABSTRACT

A computer input device uses a standard mouse design and includes at least one thumb wheel or roller to provide three-dimensional cursor positioning. Left and right rollers, for use by left- and right-handed users, protrude from left and right sides of a standard mouse. The left and right rollers are axially mounted on left and right drive shafts that extend axially through left and right encoder wheels, respectively. Each encoder wheel forms part of a transducer for producing signals indicating movement or rotation of the wheel. These signals can be used for calculating cursor movement or for various other purposes in computer software applications. Alternatively, the rollers are coupled to switches or a single roller protrudes from the top of the mouse.

16 Claims, 4 Drawing Sheets

3-D CURSOR POSITIONING DEVICE

TECHNICAL FIELD

This invention relates to computer input devices, particularly mice and trackballs.

BACKGROUND OF THE INVENTION

In today's computers, cursor movement, to select window and menu items, is often controlled using input devices such as mice or trackballs. Mice and trackballs both include a housing partially enclosing a rotatable ball and have one or more depressable buttons. Electronic encoders sense the rotation of the ball and generate signals indicating the ball's rotation. These signals are used to control movement of a cursor on a display screen of the computer. The ball either protrudes from the top of the housing (in a trackball) or below the housing (in a mouse). With a mouse, the housing is moved across a surface, typically a table top, causing the ball protruding below the housing to roll in a similar direction. The electronic encoders produce signals that are output to a computer reflecting such movement.

The buttons are used to enter commands into the computer, usually based on the current position of the cursor on the display screen. Depressing the button permits the user to enter various commands into the computer. Examples of such commands include: opening or pulling down a menu; launching an application; create starting, ending or other points in a graphic pattern on the screen; moving objects to different locations on the screen; and the like.

Currently commercially available computer input devices generally permit only two-dimensional positioning of a cursor. Some computer program applications are available which permit illusory positioning of a cursor in three-dimensional space on a two-dimensional video display device. European Patent Application WO 93/11526 describes a computer input device which permits three-dimensional positioning of a cursor. This device uses a stationary transmitter and a moveable receiver. The transmitter includes three speakers spaced apart in an "L" or "T" shape. The movable receiver includes three microphones spaced apart in a triangular shape. The speakers transmit ultrasonic signals which are received by the microphones. A calibration microphone is further included on the receiver. Control circuitry measures the time of delay for sound to travel from each of the three speakers in the transmitter to each of the three microphones in the receiver. From this delay information and the speed of sound in air (calibrated for that time and location), the device determines the three-dimensional position of the movable receiver with respect to the stationary transmitter. Sophisticated electronics and expensive components are required in this three-dimensional computer input device to perform the position/attitude computations.

Overall, the inventors are unaware of any three-dimensional cursor positioning or computer input device which avoids sophisticated electronics and expensive components yet provides accurate cursor positioning.

SUMMARY OF THE INVENTION

According to principles of the present invention, a computer input device uses a currently available mouse design and includes at least one thumb or roller wheel to provide three-dimensional cursor positioning. Left and right rollers, for use by left- and right-handed users, protrude from left and right sides of the mouse. The left and right rollers are axially mounted on left and right drive shafts that extend axially through left and right encoder wheels, respectively. Each encoder wheel separates a pair of optoelectronic devices and selectively permits light transmitted by one device to be received by the other device. The optoelectronic devices provide quadrature signals used for calculating cursor movement. The X and Y coordinates of an object or cursor in three-dimensional space are controlled by the standard ball and two encoder wheels. Either the left or right roller and encoder wheel provide Z dimension coordinate signals.

The present invention allows a standard mouse design to provide three-dimensional computer input signals with only slight modifications, and uses currently available mouse components (encoder wheels, optoelectronic devices, etc.). Consequently, a very low-cost, three-dimensional computer input device may be readily manufactured. In a first alternative embodiment, the rollers are modified to provide switch functions, thus allowing for an additional mouse input. In a second alternative embodiment, a single roller protrudes from the top of a standard mouse, between primary and secondary input buttons. Ergonomically, this second alternative embodiment may be preferred, and allows for a reduced part count.

The present invention may be used in a variety of applications. For example, the secondary mouse button could be used to enable and disable a vector orientation mode, particularly for use in computer-aided design/computer-aided manufacturing applications. In this mode, the attitude of an object may be adjusted about three orthogonal axes (i.e., roll, pitch, and yaw). Alternatively, the ball can control the X and Y coordinates to position a cursor. The thumb wheel could then control a characteristic of an item on a visual display screen of the computer designated by the cursor. Additional three-dimensional applications for the present invention include: moving up, down and through various overlapping spreadsheet or windows; varying the size of a window, highlighting text and then varying its size or style; zooming in or out of a document or picture; adjusting the color or volume in applications; and three-dimensional movement in games.

The present invention embodies an input device for providing user commands to a computer comprising a housing and first and second transducers supported by the housing. The first and second transducers receive user commands and produce respective first and second signals in response thereto. A user actuatable member is received by the housing, the member capable of being actuated in opposing directions. The member is adapted to produce a third signal indicating the user's actuation of the member. A control circuit coupled to the first and second transducers and the member receives the first, second and third signals and provides an output signal to the computer in response thereto.

Preferably, the member is a first roller projecting from the housing and coupled to a third transducer producing the third signal indicative of the rotation of the first roller. In a first alternative embodiment, the input device includes a switch coupled to the control circuit to produce a switch signal upon actuation of the switch. The first roller is slidably received by the housing and the switch is positioned adjacent to the first roller. Sliding of the first roller results in actuation of the switch. In a second alternative embodiment, the first roller projects from a top of the housing.

Other features and advantages of the present invention will become apparent from studying the following detailed description of the presently preferred exemplary embodiment, together with the following drawings.

DETAILED DESCRIPTION OF THE PRESENTLY PREFERRED EXEMPLARY EMBODIMENT

Figure 1:
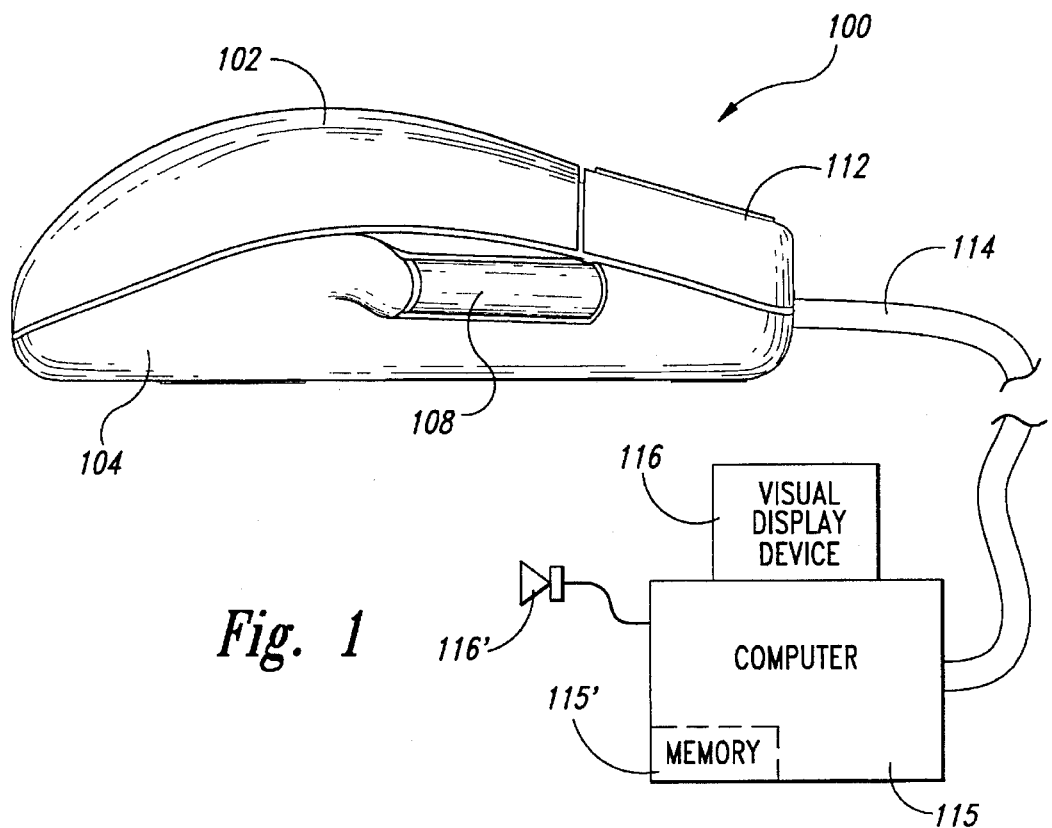
FIG. 1 is an isometric right side view of the computer input device of the present invention.
Figure 2:
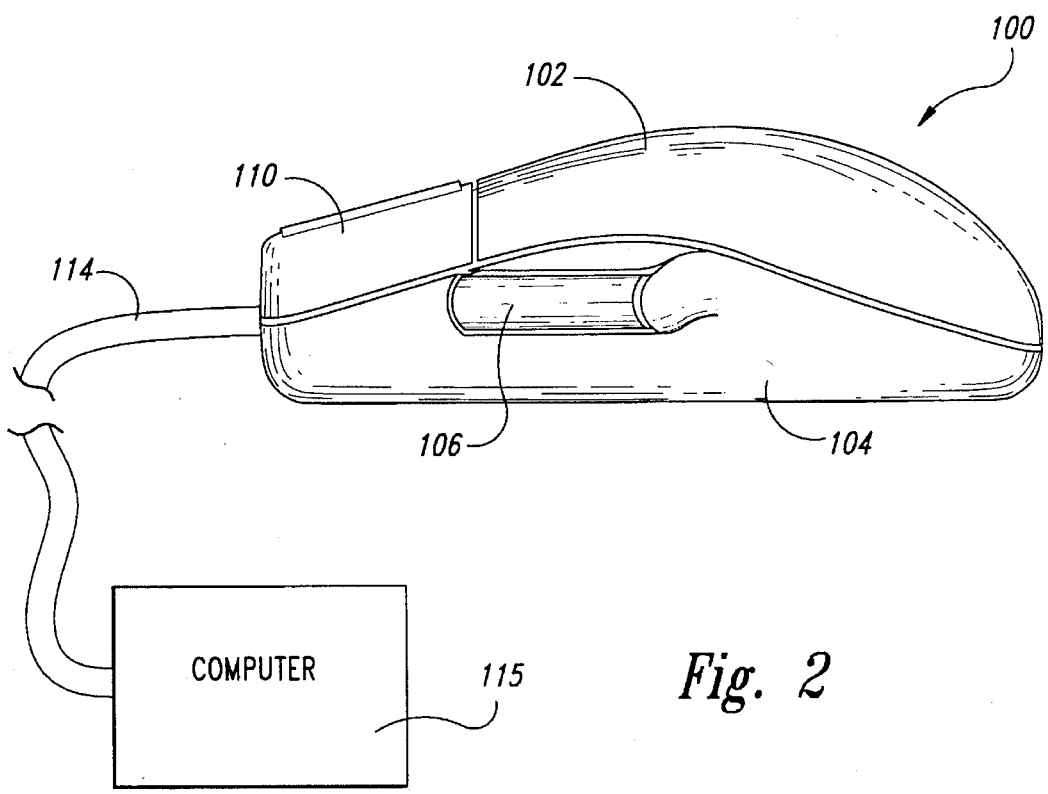
FIG. 2 is an isometric left side view of the computer input device of FIG. 1.
Figure 3:
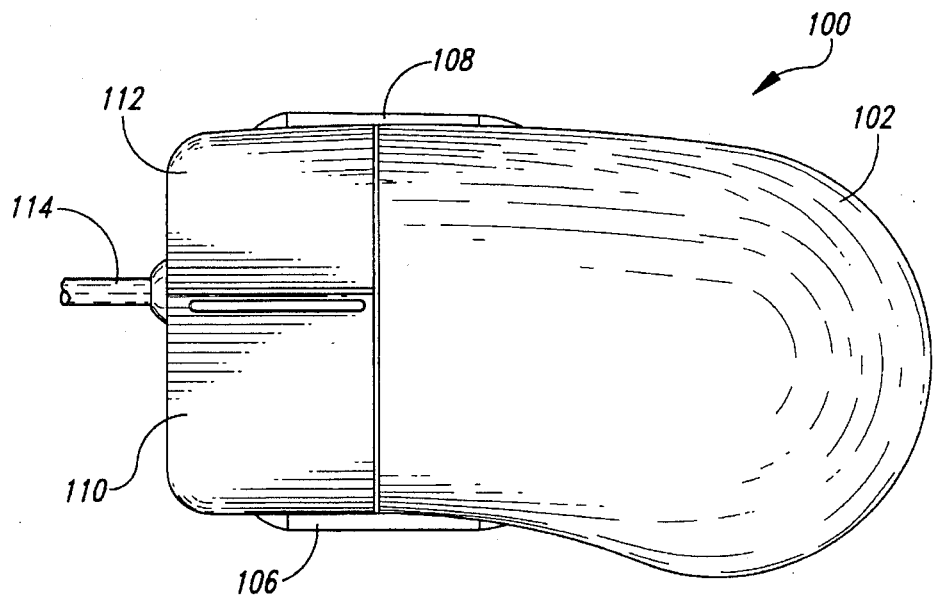
FIG. 3 is a top plan view of the computer input device of FIG. 1.

FIGS. 1, 2, and 3 show a computer input device, preferably a mouse 100, according to the present invention. The mouse 100 generally includes an upper housing 102 and a lower housing 104, with left and right thumb wheels 106 and 108 projecting from left and right sides of the mouse 100, respectively. Primary and secondary input buttons 110 and 112, respectively, are provided on the upper housing 102. A cord 114 connects the mouse 100 to a host computer 115. The host computer 115 includes a visual display device 116, a speaker 116' and a memory 115' (shown in FIG. 1).

The lower housing 104 forms the major bottom surface of the mouse 100, and the upper housing 102 forms the major upper surface of the mouse 100. The upper housing 102 and the lower housing 104 together form an inner chamber and a front surface, left and right side surfaces and a curved rear surface of the mouse 100. The upper housing 102 and the lower housing 104 may be joined together by any number of connection means known by those skilled in the art.

Figure 4:
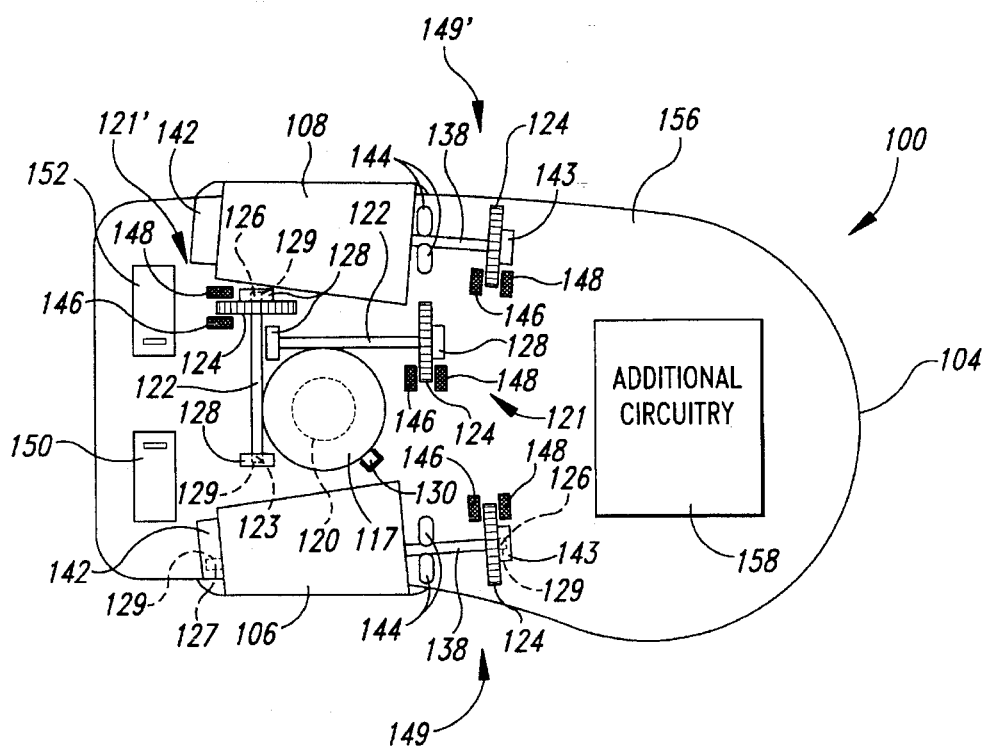
FIG. 4 is a schematic view of internal components of the input device of FIG. 1.

The upper and lower housings 102 and 104 partially enclose a ball 117. As shown in FIG. 4, the ball 117 rests in a middle portion of the lower housing 104, allowing a portion of the ball to protrude through a hole 120 (shown in dashed lines) in the lower surface of the mouse 100. X and Y axis transducers 121 and 121', respectively, preferably motion-to-electricity transducers, each include an encoder wheel shaft 122 and an encoder wheel 124 axially fixed to an end of each encoder wheel shaft 122, shown more clearly in FIG. 5. Preferably, the encoder wheel shaft 122 and the encoder wheel 124 are formed together as a single part. The encoder wheel shafts 122 are positioned perpendicular to each other within the housing and adjacent to the ball 117. A series of holes or notches 125 are formed along the circumference of each encoder wheel 124.

A wheel pin 126 and an end pin 127 axially extend from each encoder wheel shaft 122 into a pair of pin holes 129, formed in a pair of shaft supports 128, to rotatably receive the encoder wheel shaft. The wheel pin 126 axially extends from the end of the encoder wheel shaft 122 proximal to the encoder wheel 124. The end pin 127 axially extends from the end of the encoder wheel shaft 122 distal from the encoder wheel 124. The shaft supports 128 are preferably formed in the lower housing 104 and project upward from the bottom surface. Each pair of shaft supports 128 rotatably retains one of the encoder wheel shafts 122.

With reference to FIG. 4, a spring-biased roller 130 projects upwardly from and is rotatably retained by the lower housing 104. The springbiased roller 130 is positioned opposite to an interior angle formed by the perpendicularly positioned encoder wheel shafts 122 and biases the ball 117 against the encoder wheel shafts and toward the interior angle, while allowing the ball to freely rotate in a planar fashion. The ball 117 is preferably made of rubber-covered steel and the encoder wheel shafts 122 and encoder wheels 124 are preferably made of glass-reinforced plastic. The rubber provides sufficient friction against the polycarbonate encoder wheel shafts whereby rotation of the ball 117 caused by sliding the mouse 100 over a planar surface causes the encoder wheel shafts 122 and the encoder wheels 124 to similarly rotate.

Figures 5, 7:
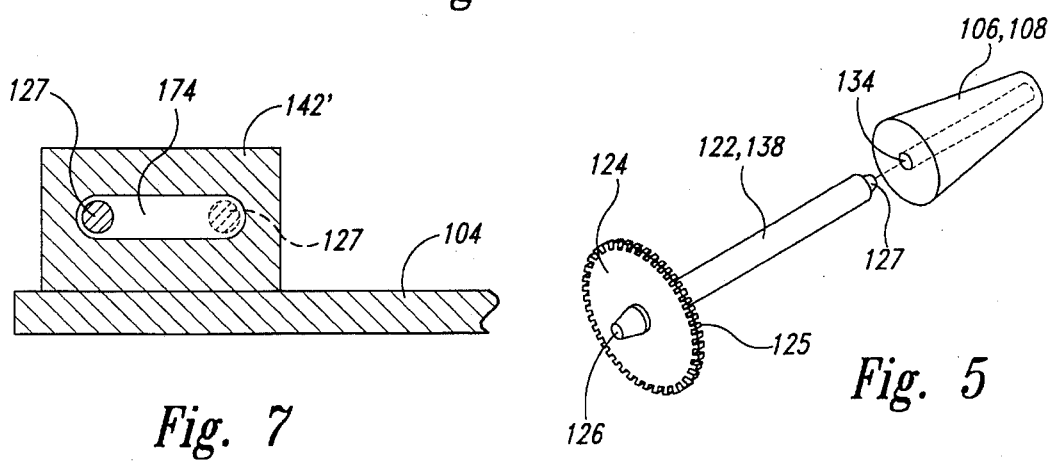
FIG. 5 is an isometric view of an encoder wheel thumb wheel shaft and thumb wheel of the computer input device of FIG. 1.
FIG. 7 is an enlarged cross-sectional view of an upper thumb wheel shaft support taken along the line 7—7 of FIG. 6.

As shown in FIG. 5, the left and right thumb wheels 106 and 108 are elongated cylinders or conical frustums each having an axial bore 134. A thumb wheel shaft 138 is positioned through the axial bore 134 of each thumb wheel 106 and 108 and is fixed thereto. The thumb wheel shaft 138 is generally longer than the encoder wheel shaft 122 to accommodate the thumb wheel thereon. Each thumb wheel shaft 138 has a wheel pin 126, end pin 127 and an encoder wheel 124, as is formed on each encoder wheel shaft 122. Each thumb wheel 106 or 108 is fixed to an end of the thumb wheel shaft 138 proximate to the end pin 127, with the encoder wheel 124 fixed to the other end proximate to the wheel pin 126. A pair of thumb wheel shaft supports having pin holes 129 therethrough are formed in the lower housing 104 and project upward from the bottom surface, one pair formed proximate to the left side of the mouse 100 and the other pair formed proximate to the right side. Each pair of thumb wheel shaft supports consists of an upper thumb wheel shaft support 142 rotatably retaining the end pin 127 of one of the thumb wheel shafts 138 in its pin hole 129 and a lower thumb wheel shaft support 143 rotatably retaining the wheel pin 126 in its pin hole. The thumb wheel shaft supports are positioned on the lower housing 104 whereby when the thumb wheel shafts 138, with the thumb wheels 106 and 108 mounted thereon, are rotatably retained by the upper and lower thumb wheel shaft supports 142 and 143, the thumb wheels project from and extend along the left and right sides of the housing, between a left to right extending centerline of the housing and the front. When so positioned, the left and right thumb wheels 106 and 108 are proximate to the primary and secondary input buttons 110 and 112 on the upper surface of the mouse 100. When a user places his or her palm on the major upper surface of the mouse 100, his or her fingers extend forward so they are able to access the primary and secondary buttons 110 and 112. While the palm is in this position, the thumb extends over the left or right side so it is able to access the left or right thumb wheel 106 or 108 (depending on whether he or she is left- or right-handed).

A pair of longitudinal thumb wheel shaft supports 144 project upward from the lower housing between each pair of thumb wheel shaft supports 142 and 143. Each pair of longitudinal thumb wheel shaft supports 144 receive an outer circumference of one of the thumb wheel shafts 138. Each pair of longitudinal thumb wheel shaft supports 144 are positioned approximately equidistant between each pair of thumb wheel shaft supports 142 and 143 such that when one of the thumb wheel shafts 138 is mounted thereon, the thumb wheel and upper thumb wheel shaft support 142 are positioned forward of the longitudinal shaft support, and the encoder wheel 124 and lower thumb wheel shaft support 142 are located rearward of the longitudinal shaft support. The longitudinal shaft supports 144 inhibit each thumb wheel shaft 138 from left or right movement, particularly when either thumb wheel 106 or 108 is rotated by a user.

The shaft supports 128 and thumb wheel shaft supports 142 and 143 are preferably formed of a flexible plastic to permit the encoder wheel shafts 122 and thumb wheel shafts 138, respectively, to be snapfit therein during assembly. Similarly, the pair of longitudinal shaft supports 144 each have a curved recess (not shown) facing toward each other to allow the thumb wheel shaft 138 to be snapfit down into and between the pair of longitudinal shaft supports 144 with the shaft 138 rotatably received by the recesses on the inner surfaces of the longitudinal shaft supports 144.

A light-emitting element, preferably a light-emitting diode ("LED") 146, is positioned on one side of each encoder wheel 124. A light-detecting element, preferably a phototransistor 148, is positioned opposite each LED 146 on the other side of each encoder wheel 124. As each encoder wheel 124 rotates, light from the LED 146 is alternatively blocked and transmitted through the encoder wheel 124 and received by the phototransistor 148 depending on whether one of the notches 125 separates the LED 146 and phototransistor 148. While notches in the encoder wheel 124 are shown in FIG. 5, any other form of shutter to modulate light from each LED 146 to each phototransistor 148 may be used.

The X and Y axis transducers 121 and 121', respectively, each include one of the LEDs 146 and one of the phototransistors 148. Similarly, left and right Z axis transducers 149 and 149', respectively, each include one of the thumb wheel shafts 138, encoder wheels 124, LEDs 146 and phototransistors 148.

A primary switch 150 and a secondary switch 152 are positioned below the primary input button 110 and the secondary input button 112, respectively, whereby actuation of the primary or secondary input button results in actuation of the corresponding switch. The primary and secondary switches 150 and 152, the LEDs 146 and the phototransistors 148 are all mounted on a single printed circuit board 156, and coupled by known means to additional circuitry 158 mounted thereon. The additional circuitry 158 includes a microcontroller and other discrete electronic devices known by those skilled in the relevant art to cause the LEDs 146 to emit light, to cause the phototransistors 148 to produce signals based on the light, to receive the signals, and to convert these signals to appropriate computer signals to be output over the cord 114 to the computer 115. See, e.g., U.S. Pat. No. 4,464,652 to Lapson et al., U.S. Pat. No. 4,533,830 to Beauprey, and U.S. Pat. No. 4,562,314 to Hosogoe et al., all incorporated herein by reference.

In operation, the mouse 100 is moved or slid along a planar surface, causing the ball 117 protruding through the hole 122 to rotate. As the ball 117 rotates, it rotates the encoder wheel shafts 122 of the X and Y axis transducers 121 and 121', which, in turn, rotate the encoder wheels 124 fixed thereon. As the encoder wheels 124 rotate, the phototransistors 148 receive pulses of light from the LEDs 146 as the notches 125 sweep past the LEDs. Each phototransistor 148 converts these pulses of light into varying electrical signals which are input to the additional circuitry 154.

While each phototransistor 148 is shown and described generally herein as a single element, the present invention preferably uses a single photodetector package having two phototransistors therein, such as the photodetector Model No. LTR-5576D, manufactured by LITEON. Consequently, each phototransistor 148 produces two signals or "quadrature signals." The phototransistor 148 that forms part of the X axis transducer 121 produces quadrature signals "XA" and "XB." The phototransistor 148 that forms part of the Y axis transducer 121' produces quadrature signals "YA" and "YB."

The two phototransistors in each phototransistor 148 are separated by a known distance whereby one phototransistor in the photodetector is positioned at one of the notches 125 to receive light from the LED 146, causing the phototransistor to output a "high" signal that is interpreted by the additional circuitry 158 as a digital "1" quadrature signal. Conversely, the other phototransistor in the phototransistor 148 is blocked by the encoder wheel 124 from receiving light from the LED 146 and consequently outputs a "low" signal interpreted as a digital "0" quadrature signal. As a result, the two quadrature signals output from the phototransistor 148 produce a quadrature, that is, the signals are out of phase. The additional circuitry 154, namely the microcontroller, senses transitions between digital "0" and "1" input signals or levels in the two quadrature signals. Based on a comparison of these transitions, the additional circuitry 154 determines the direction in which the mouse is being moved. For example, if the quadrature signals XA and XB output from the phototransistor 148 are "00" followed by "10," then the additional circuitry 154 recognizes that the mouse 100 is being moved in one direction along the X axis. Conversely, if the quadrature signals XA and XB are "11" followed by "10," then the additional circuitry 154 recognizes that the mouse 100 is being moved in the opposite direction.

The number of transitions between digital "0" and "1" signals detected by the additional circuitry 154 indicates the magnitude of mouse travel. Together, determination of direction and magnitude of mouse travel are referred to in the art as quadrature calculation. Quadrature calculation is performed by the additional circuitry 154 using known techniques. The quadrature calculations convert the quadrature signals into count signals indicating movement of the mouse 100 along X and Y axes. The count signal are either positive or negative, indicating movement of the mouse 100 in either a forward or reverse direction along a particular axis. The host computer 115 converts these counts into cursor movements on the visual display device 116. These counts and other mouse signals output to the host computer are preferably similar to the mouse signals described in *Microsoft Mouse Programmer's Reference,* Microsoft Press, 1991.

Based on the above discussion, the X axis transducer 121 and associated phototransistor 148 produce XA and XB quadrature signals which are converted by the additional circuitry 154 into count signals indicating movement or position of the mouse 100 along the X axis, referred to herein as "X axis computer signals." The Y axis transducer 121' and associated phototransistor 148 produce YA and YB quadrature signals which are converted by the additional circuitry 154 into count signals indicating movement or position of the mouse 100 along the Y axis, referred to herein as "Y axis computer signals."

Likewise, the left and right Z axis transducers 149 and 149', respectively, and associated phototransistors 148 produce two pairs of Z axis quadrature signals (each pair including a "ZA" and "ZB" component), which are input to the additional circuitry 154. For example, when the left thumb wheel 106 is rotated by a user's thumb, the thumb wheel shaft 138 similarly rotates about its wheel pin 126 in the lower thumb wheel shaft support 143, and its end pin 127 in the upper thumb wheel shaft support 142. As the thumb wheel shaft 138 rotates, the encoder wheel 124 fixed thereon similarly rotates, and the phototransistor 148 receives pulses of light from the LED 146 as the notches 125 sweep past the LED. In response to the pulses of light, the phototransistor 148 outputs the Z axis quadrature signals ZA and ZB. The additional circuitry 154 determines the direction and magnitude of "simulated" mouse travel along the Z axis from these quadrature signals using quadrature calculation, thus producing counts indicating the simulated movement or position of the mouse along the Z axis or "Z axis computer signals." These Z axis count signals are preferably summed together, and therefore either the left thumb wheel 106 or the right thumb wheel 108 may be used for Z axis movement of the mouse 100. If both the left thumb wheel 106 and the right thumb wheel 108 are rotated simultaneously and in opposite directions, the summed counts would cause the cursor to move twice as quickly along the Z axis than rotation of only a single thumb wheel. Alternatively, a switch can be provided, coupled to the additional circuitry 158, that disables the output of the Z-axis count signals to the computer.

An actuation of the secondary switch 152 can enable the left and right thumb wheels 106 and 108 and the additional circuitry 158 to produce the Z axis computer signals. A second actuation of the secondary switch 152 could then position the cursor at a 0 position along the Z axis. Rotation of either thumb wheel in one direction or the other would thereafter result in movement of the cursor in either a positive or negative direction along the Z axis, respectively. Alternatively, actuations of the secondary switch 152 could toggle between movement of the cursor along positive or negative portions of the Z axis. Movement along the Z axis may be represented on the two-dimensional visual display device 116 as varying the size of the cursor whereby a cursor of increasing size indicates movement in the positive direction along the Z axis, and a cursor of diminishing size indicates movement of the cursor in a negative direction.

In a first alternative embodiment 200 of the present invention shown in FIG. 6, a thumb wheel switch 170 is positioned adjacent to each thumb wheel shaft 138, allowing actuation of the switch 170 by depressing and pivoting either the thumb wheel 106 or 108 inwardly as described below. The thumb wheel switches 170 are provided in addition to, or in lieu of, the primary and secondary switches 150 and 152. This first alternative embodiment, and all alternative embodiments described herein, are substantially similar to the first described embodiment and common elements or components are identified by the same numbers. Only the differences in construction and operation are described in detail.

Figure 6:
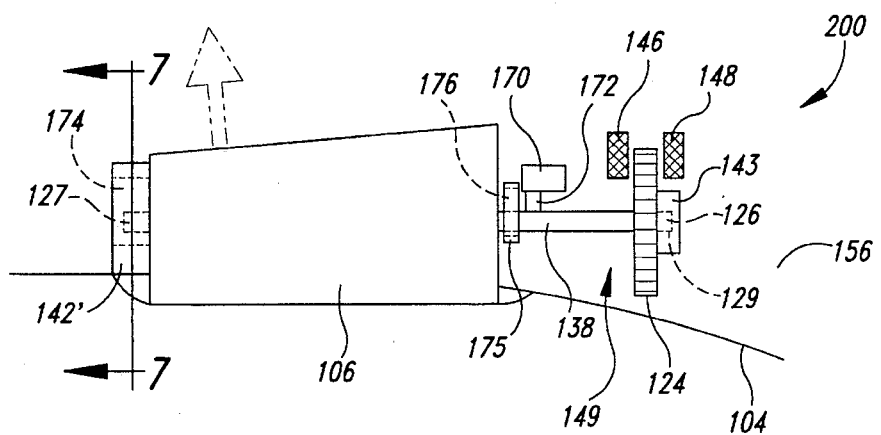
FIG. 6 is an enlarged, partial schematic view of a first alternative embodiment of the computer input device of FIG. 1.

Referring to FIG. 6, the thumb wheel switch 170 is fixed and electrically connected to the printed circuit board 156 between the left thumb wheel 106 and the encoder wheel 124. A button 172 extends outwardly from the thumb wheel switch 170 toward the left side of the mouse and against the thumb wheel shaft 138. A spring within the thumb wheel 170 (not shown) biases the button 172 outwardly and against the thumb wheel shaft 138. A slot 174, shown in FIG. 7, extends longitudinally left to right within an upper thumb wheel shaft support 142'. The end pin 127 is slidably received within the slot 174. A central shaft support 175 projecting upward from the lower housing 104, between the left thumb wheel 106 and the encoder wheel 124, similarly has a longitudinally extending slot 176 which slidably receives the thumb wheel shaft 138 therein.

The button 172 biases the end pin 127 and the thumb wheel shaft 138 against the leftmost end of the slots 174 and 176, respectively. While the left thumb wheel 106 is depressed inwardly, the end pin 127 and the thumb wheel shaft 138 slide longitudinally and inwardly left to right, through the slots 174 and 176, respectively, until each rests against the rightmost end of the slots. The left thumb wheel 106 and thumb wheel shaft 138 is simultaneously pivoted inwardly about the wheel pin 126, as shown by the arrow in FIG. 6. Concurrently, the button 172 is depressed inwardly, compressing the spring and actuating the thumb wheel switch 170. When the left thumb wheel 106 is released, the spring in the thumb wheel switch 170 biases the button 172 outwardly, pivoting the thumb wheel 106 left and outwardly about the wheel pin 126, and sliding the end pin 127 and the thumb wheel shaft 138 left and through slots 172 and 176, respectively.

Figure 8:
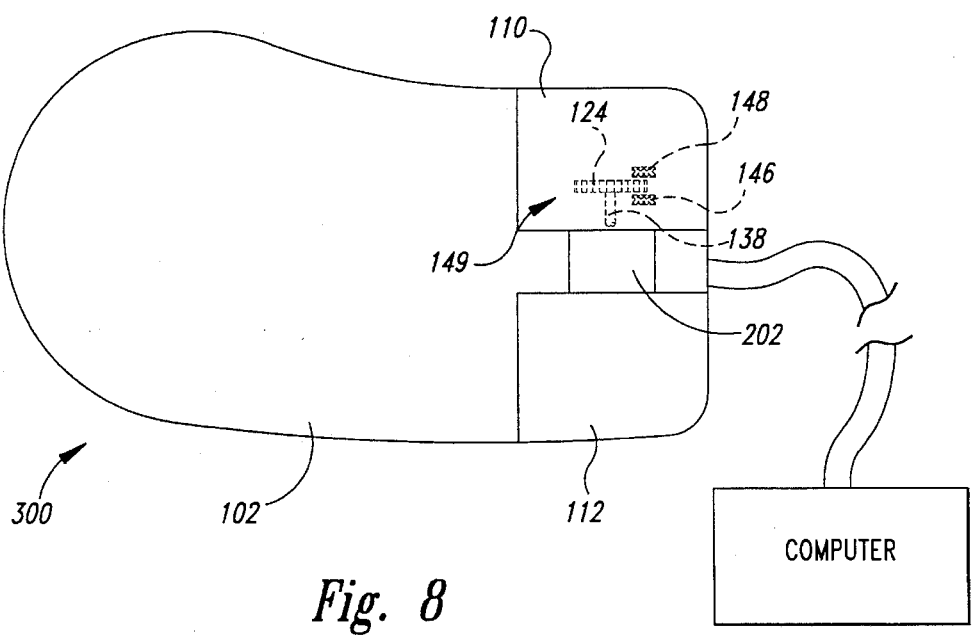
FIG. 8 is a top plan view of a second alternative embodiment of the input device of FIG. 1.

A second alternative embodiment of the present invention is shown in FIG. 8 as a mouse 300 that replaces the left and right thumb wheels 106 and 108 with a single upper thumb wheel 202. The upper thumb wheel 202 protrudes above the upper housing 102, between the primary and secondary input buttons 110 and 112. The primary and secondary input buttons 110 and 112 respectively actuate the primary and secondary switches 150 and 152 (not shown). The upper thumb wheel 202 is axially attached to a thumb wheel shaft 138 (shown in dashed lines). The upper thumb wheel 202 may be rotated by a user's finger, as opposed to the user's thumb, as his or her hand rests on the major upper surface 102 of the mouse 300. Ergonomically, the upper thumb wheel 202 provides more accurate user input than the left or right thumb wheels 106 and 108. Additionally, the second alternative embodiment provides a reduced part count over the previous embodiments while still permitting both left- and right-handed users to readily access the thumb wheel.

Figure 9:
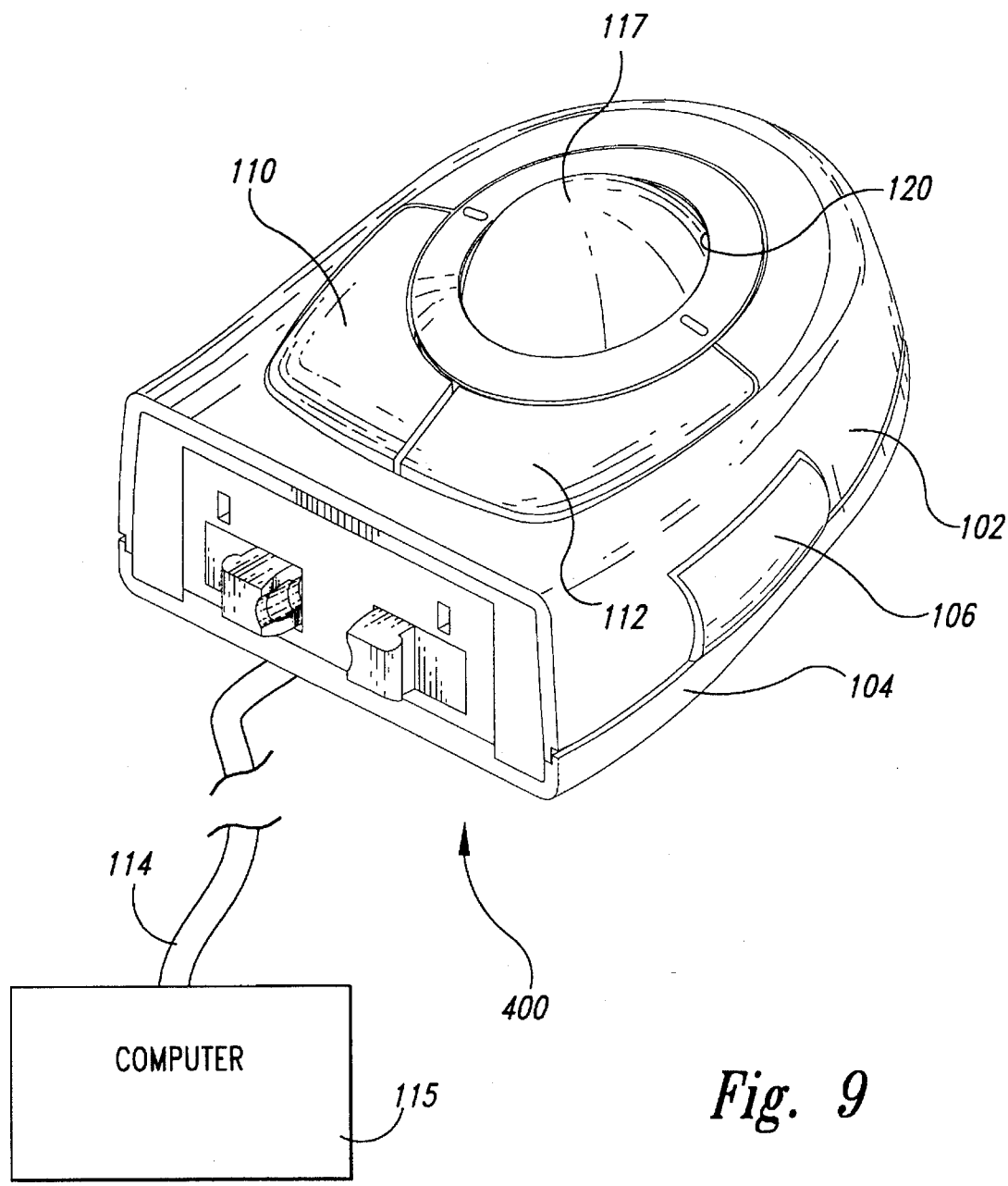
FIG. 9 is an isometric view of a third alternative embodiment of the present invention.

A third alternative embodiment of the present invention is shown in FIG. 9 as a trackball 400 having a left thumb wheel 106 protruding from the left side of the housing. The trackball 400 may also include a right thumb wheel 108 protruding from the right side of the housing. The internal components of the trackball 400 are substantially similar to those shown in FIG. 4 and described herein.

While the Z axis computer signal is described herein as being produced by a roller, encoder wheel and optoelectronic devices, the present invention may also produce the Z axis computer signal by using other electromechanical means. Specifically, the present invention may instead use a rocker switch, pressure-sensitive switches, joysticks, or other electromechanical switches, with an appropriate transducer if necessary, known by those skilled in the relevant art.

While the mouse 100 is described above as moving a cursor in three dimensions, the present invention may be used in a variety of computer software applications. Generally, a computer software application uses the X, Y and Z axis computer signals and primary and secondary switch signals in a fashion particular to the computer software application. The computer software application, based on changes in these various signals, determines changes in the visual output as seen by the user on the visual display device 116.

For example, the X and Y axis computer signals, produced by moving the mouse 100 along a planar surface, may be used to select a block of graphical data with appropriate switch input signals from either the primary or secondary switches 150 or 152. "Graphical data" as used herein includes text, documents, tables, spreadsheets, images, captured video data, and so forth. The Z axis computer signal, produced as a result of rotating the left, right or upper thumb wheel 106, 108 or 202, respectively, may be used to adjust the appearance of the block of graphical data, with appropriate switch signals if necessary. "Appearance" as used herein includes size, color, style, font, border, arrangement, brightness, etc. The primary and secondary switches 150 and 152 may be used to select a desired appearance. For example, a block of text is first selected from the X and Y axis computer signals by moving the mouse about a planar surface. Thereafter, the Z axis computer signal, produced as a result of rotating the thumb wheel, varies the size of the text if the primary switch 150 is actuated or the style of the text if the secondary switch 152 is actuated.

The Z axis computer signal may be used to select one of many overlapping plies. As used herein, a ply is a two-dimensional representation of data such as a spreadsheet or text document. Once a particular ply is selected (with an appropriate switch signal), the X and Y axis computer signals move a cursor 261 within the selected ply. As used herein, the term "cursor" includes any cursor, icon or pointer represented on a visual display device. The X, Y and Z axis computer signals may be used to navigate through three-dimensional "workbooks" such as spreadsheets.

For example, in the spreadsheet environment, the left, right or upper thumb wheel 106, 108 or 202, respectively, cause the Z axis computer signal to be generated by the additional circuitry 158, which is in turn used by the computer 115 executing a computer spreadsheet software application. The Z axis computer signal is used by the computer 115, via the spreadsheet software application, to select one of many spreadsheets or plies within a three-dimensional spreadsheet depicted on the visual display device 116 of the computer, the plies being two-dimensional spreadsheets arrayed along the third or Z dimension. Both the spreadsheet software application and the many plies are stored in a memory 115' of the computer 115.

At any point in time, one of the many plies will be "active," i.e., dominantly or top-most displayed ply 262 on the visual display device 116 of the computer 115, allowing a user to manipulate data within that ply. The computer 115, executing the spreadsheet software application, translates the changing Z axis computer signal into a selection of which one of the arrayed plies is active. A user rotates one of the thumb wheels, generates the Z axis computer signal, and thereby moves from the active ply 262 to one of the other plies 264 or 266, making each ply therebetween active in succession during such movement. The last ply indicated when movement of the thumb wheel ceases, is displayed on the visual display device of the computer 115. This movement or scrolling from one ply to another is similar to scrolling among the rows or columns within a ply. Thus, the Z axis computer signal may be used for this third-dimensional scrolling between plies moving successively among the arrayed plies, forward or backward (plus or minus Z axis movement), depending on the direction in which the thumb wheel is rotated.

Specifically, as one of the thumb wheels is rotated and the Z axis computer signal is generated, the computer 115, via the spreadsheet software application, interprets how far the thumb wheel has been rotated and thereby determines which ply is active. For example, an eighth of a rotation of the thumb wheel (corresponding to a number of counts or values in the Z axis computer signal) causes the computer 115 to make the next ply active. If the last (or first) ply is active and the thumb wheel is still being rotated, the computer 115 provides an audible signal through the speaker 116' indicating that no additional plies underlie (or precede) the current ply. Alternatively, the host computer 115 compares the current value of the Z axis computer signal to a table stored in the memory 115' and determines which of the several plies is to be active. Once determining which of the many plies is active, the computer 115 retrieves from the memory 115' the active ply 262 and displays it on the visual display device 116. Thereafter, the X and Y axis computer signals, generated by rotating the ball 117, are used by the computer 115 to move the cursor about the active ply 262 to a desired cell within the ply.

The secondary switch 152 may be actuated to cause the mouse 100 to enter into a vector orientation mode. In the vector orientation mode, the X, Y and Z axis computer signals may be used to orient the attitude of a video object in space. "Attitude" refers to the roll, pitch and yaw orientation of the video object. "Video object" refers to a cursor, graphic, or other image represented on a visual display. The primary switch 150 can be used to disable the vector orientation mode.

Additional applications for the present invention include using the Z axis computer signal to vary the size of a selected window or spreadsheet, zooming in or out of graphical data, adjusting the color or volume in computer software applications, and three-dimensional movement in games.

The present invention allows a standard mouse design to provide three-dimensional computer input signals with only slight modifications, and uses currently available mouse components (e.g., encoder wheels, LEDs, photodetectors, slightly modified mice housings, etc.). Since most of the components necessary under the present invention are located on a single printed circuit board, no additional manufacturing processes over those required for existing mice are required for manufacturing the present invention. Additionally, allowing the encoder wheel shafts 122 and the thumb wheel shafts 138 to be snapfit within the shaft supports formed in the lower housing 104, the mouse 100 of the present invention may be easily assembled. Consequently, the present invention describes a very low-cost three-dimensional computer input device that may be readily manufactured.

Although specific embodiments of, and examples for, the present invention have been described for purposes of illustration, various modifications may be made without departing from the spirit and scope of the invention, as is known by those skilled in the relevant art. For example, while optoencoding methods are described herein using LEDs and photodetectors, other methods of producing quadrature signals may be employed, for example, using encoder wheels having electrical contacts along their circumference which alternatively make contact with electrical brushes as the encoder wheels rotate. The teachings provided herein of the present invention may be applied to other computer input devices, including optical mice or pen and tablets where the Z axis computer signal is produced by a thumb wheel provided on the optical mouse or the pen. These and other changes may be made to the invention in light of the above detailed description. Accordingly, the invention is not limited by the disclosure, but instead its scope is to be determined entirely by reference to the following claims.

We claim:

1. An input device for a computer comprising:

a housing;

a rotatable ball received within the housing;

first and second transducers positioned within the housing and coupled to the rotatable ball, the first and second transducers producing first and second signals indicative of the rotation of the ball;

an elongated first rotatably mounted roller projecting from the housing, the first roller having first and second end portions, the first end portion being pivotally received by the housing for pivotal movement of the first roller and the second end portion being free to move between a rest position and an actuation position as the first roller is pivoted about the first end portion;

a third transducer coupled to the first roller to produce a third signal indicative of the rotation of the first roller;

a control circuit coupled to the first, second and third transducers for receiving the first, second and third signals and outputting a computer signal to the computer in response thereto; and, a first switch coupled to the control circuit and adapted to produce a first switch signal upon actuation of the first switch, the first switch being positioned adjacent to the first roller to be engaged by the first roller to actuate the first switch when the first roller is pivoted from the rest position to the actuation position.

2. The input device of claim 1, further comprising:

a second rotatably mounted roller projecting from the housing, and a fourth transducer positioned about the second roller to also produce the third signal indicative of the rotation of the second roller, the first and second rollers projecting from left and right sides of the housing, respectively, the second roller being received by the housing for movement between a rest position and an actuation position; and a second switch coupled to the control circuit adapted to produce a second switch signal upon actuation of the second switch, wherein the second switch is positioned adjacent to the second rotatable roller, and the second rotatable roller to cause actuation of the second switch when moved from the rest position to the actuation position.

3. The input device of claim 2 wherein the first, second and third transducers are of approximately identical construction, and the first and second rollers are of approximately identical construction.

4. The input device of claim 1 wherein the first, second and third signals indicate position in space along X, Y and Z axes, respectively, and wherein actuation of the first switch causes the first, second and third signals to indicate orientation in space.

5. The input device of claim 1 wherein actuation of the first switch is adapted to enable the control circuit to output the computer signal in response to the third signal.

6. The input device of claim 1 wherein the first roller projects from a top of the housing.

7. The input device of claim 6, further comprising a second switch coupled to the control circuit and adapted to produce a second switch signal upon actuation of the second switch, the first and second switches being coupled to respective first and second buttons positioned about the top of the housing and on opposing sides of the first roller.

8. The input device of claim 1 wherein the third transducer includes a first light-emitting element, a first light-detecting element and a first rotatable encoder wheel, the first rotatable encoder wheel being positioned between the first light-emitting element and the first light-detecting element to modulate light emitted from the first light-emitting element and received by the first light-detecting element, the first rotatable encoder wheel being rotated by the first roller, and wherein the third transducer includes a shaft axially fixed between the first and second end portions of the first roller and the first encoder wheel being axially fixed to the shaft of the first end portion, the shaft being rotatably and pivotally held by the housing.

9. The input device of claim 8 wherein the first and second transducers include second and third light-emitting and light-detecting elements, second and third shafts rotatably mounted in the housing adjacent to the ball, and second and third rotatable encoder wheels positioned between the second and third light-emitting and light-detecting elements and axially fixed to the second and third shafts, all respectively, wherein rotation of the ball results in rotation of the second and third shafts and second and third rotatable encoder wheels, the second and third rotatable encoder wheels selectively modulating light emitted from the second and third light-emitting elements and received by the second and third light-detecting elements, respectively.

10. The input device of claim 9 wherein the first, second and third light-emitting elements are of substantially similar construction, the first, second and third light-detecting elements are of substantially similar construction, and the first, second and third rotatable encoder wheels are of similar construction.

11. The input device of claim 1, further comprising first and second supports extending from the housing, and wherein the first roller has first and second end pins at the first and second end portions, respectively, the first end pin being rotatably received in a hole in the first support, and the second pin being slideably received in a slot in the second support.

12. The input device of claim 1 wherein the first roller has an elongated conical frustum shape.

13. A cursor positioning and user command input system comprising:

a computer having a memory and a visual display device, the computer being capable of displaying a plurality of plies, at least one of the plurality of plies being capable of overlapping and fully obscuring the other of the plurality of plies; and a user command input device coupled to the computer having a housing, first and second transducers supported by the housing and receiving user commands indicative of movement in two orthogonal directions and outputting respective first and second signals to the computer in response thereto, a user rotatable member supported by the housing capable of being rotated in opposing directions to cause a third signal to be outputted to the computer indicating the user's actuation of the member, each of the plurality of plies corresponding to a predetermined amount of rotation of the rotatable member, the computer being responsive to the third signal to determine a user selected amount of rotation of the rotatable member and scroll through and select a visually obscured ply with the predetermined amount of rotation that corresponds to the user selected amount of rotation for display on the visual display, and the computer being responsive to the first and second signals for positioning a cursor in X and Y directions on the selected ply.

14. The cursor positioning and user command input system of claim 13 wherein the user command input device includes a rotatable ball received within the housing and coupled to the first and second transducers, and wherein the user rotatable member is an elongated roller projecting from the housing and is coupled to a third transducer producing the third signal indicative of the user's actuation of the roller.

15. The cursor positioning and user command input system of claim 14 wherein the roller projects from a top of the housing, and wherein the user command input device includes first and second switches being coupled to respective first and second buttons positioned about the top of the housing and on opposing sides of the roller.

16. The cursor positioning and user command input system of claim 14 wherein the computer produces an audible signal in response to the third signal when the selected one of the plurality of plies is a first or last ply in the plurality of plies.

* * * * *

UNITED STATES PATENT AND TRADEMARK OFFICE
CERTIFICATE OF CORRECTION

PATENT NO.    :    5,473,344
DATED         :    December 5, 1995
INVENTOR(S)   :    Glade B. Bacon et al.

It is certified that error appears in the above identified patent and that said Letters Patent is hereby corrected as shown below:

On the title page at [73] Assignee: delete "corporation" and insert therefor --Corporation--

In column 3, line 30, following the description of FIG. 9, please insert --FIG. 10 is a front view of a visual display device showing several overlapping plies.--.

Signed and Sealed this

Twenty-seventh Day of August, 1996

Attest:

BRUCE LEHMAN

*Attesting Officer*    *Commissioner of Patents and Trademarks*

UNITED STATES PATENT AND TRADEMARK OFFICE
CERTIFICATE OF CORRECTION

Page 2 of 2

PATENT NO. : 5,473,344
DATED : December 5, 1995
INVENTOR(S) : Glade B. Bacon et al.

It is certified that error appears in the above-indentified patent and that said Letters Patent is hereby corrected as shown below:

In the drawings, after Sheet 4 of 4, insert the following Figure 10:

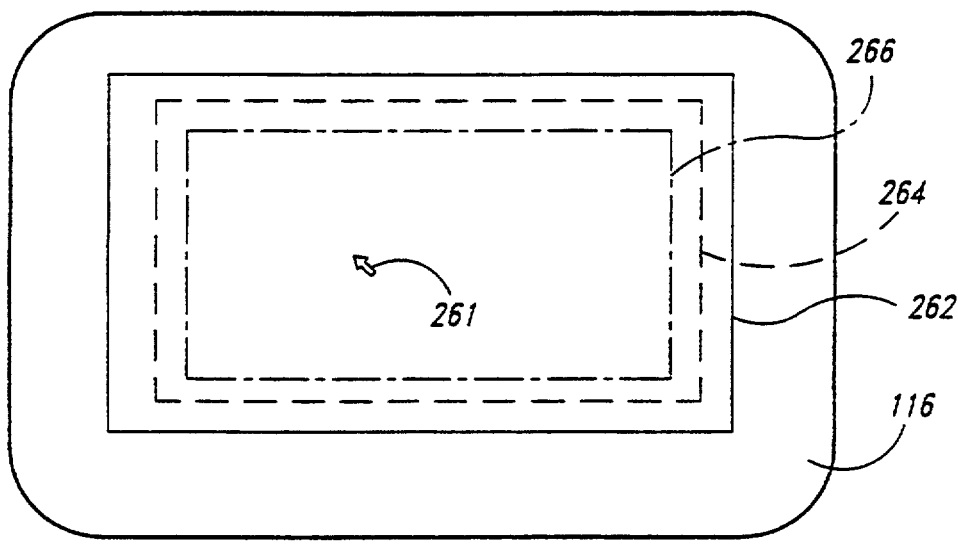

Fig. 10